March 4, 1958 B. STAHMER 2,825,649
METHOD OF MANUFACTURING POTATO CHIPS
Filed Aug. 14, 1956 2 Sheets-Sheet 1

INVENTOR.
BERNHARDT STAHMER
BY Woodling & Krost
Atty's.

March 4, 1958
B. STAHMER
2,825,649
METHOD OF MANUFACTURING POTATO CHIPS
Filed Aug. 14, 1956
2 Sheets-Sheet 2
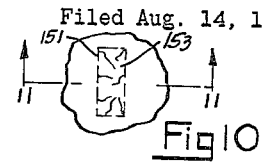
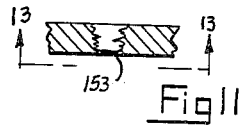
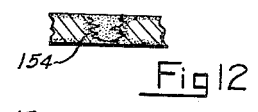
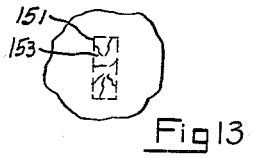
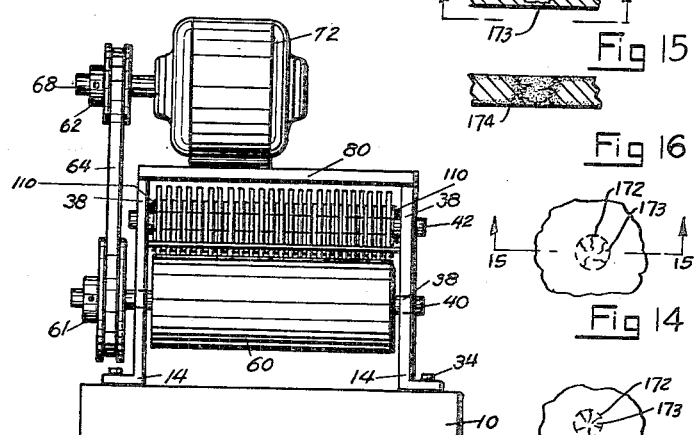
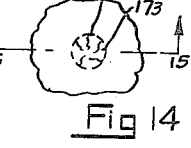
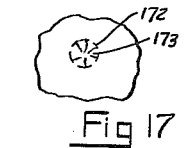
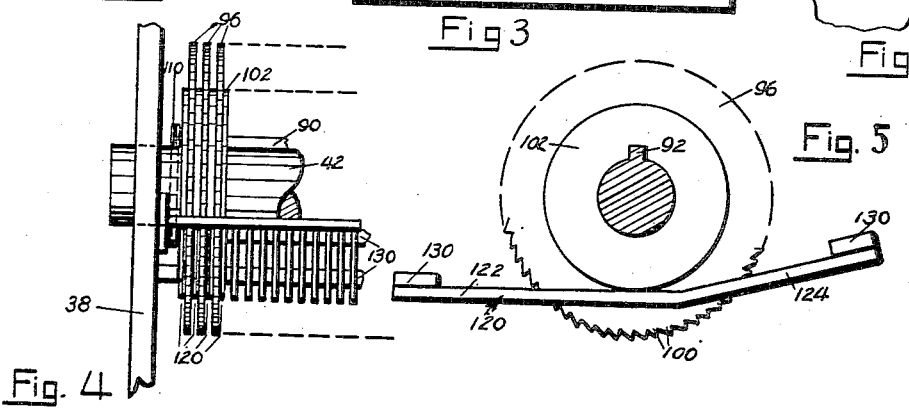
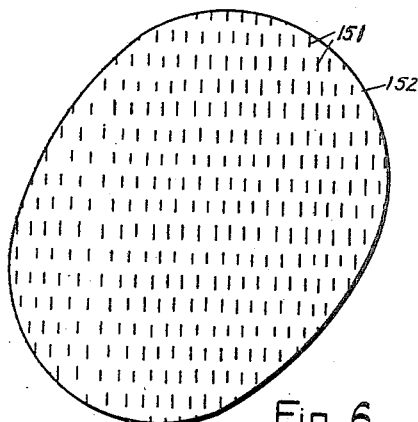
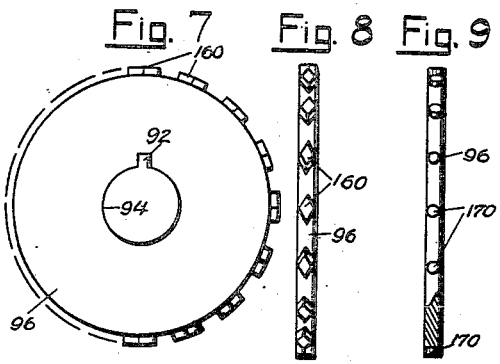
INVENTOR.
BERNHARDT STAHMER
BY Woodling & Krost
Atty's.

United States Patent Office 2,825,649
Patented Mar. 4, 1958

2,825,649

METHOD OF MANUFACTURING POTATO CHIPS

Bernhardt Stahmer, Omaha, Nebr.

Application August 14, 1956, Serial No. 603,940

1 Claim. (Cl. 99—100)

This invention relates to the manufacture of potato chips and more particularly it is an object of this invention to provide a machine for producing a more edible potato chip than heretofore.

This application is a continuation-in-part of my application, Serial No. 212,256, now abandoned, being a division of application Serial No. 103,060, now Patent No. 2,686,540.

It is, therefore, an object of this invention to provide a machine which is adapted to pierce potato chips of the flat, common "Saratoga" type across their faces and at great speed.

Another object of the invention is to provide a piercing machine as described which is adapted to pierce potato chips even faster than they are sliced by present methods.

Another object of the invention is to provide a machine as described in which the piercing elements are spaced apart as described, which is adapted to produce a potato chip in which the individual piercings are proportionately spaced from one another to permit the chip to be uniformly cooked.

Yet a further object of the invention is to provide a machine for making a chip which can be quickly soaked in water for removing more of the starch content of the chip than has been heretofore possible.

Still a further object of the invention is to provide a machine for making a fast cooking chip having piercings through which boiling cooking oils can pass.

Another object resides in the provision of a machine for producing a chip of great strength.

Yet a further object resides in the provision of a potato chip piercing machine for providing chips which are tenderized during cooking. The tenderizing adding greatly to their palatability.

Another object of the invention resides in the provision of a piercing machine for making potato chips of a type requiring a lesser cooking time for effecting a saving of fuel in manufacture.

A most important object of the invention resides in the provision of a machine for use in the manufacture of potato chips which are more crisp than heretofore, crunching more easily during chewing for avoiding the stick, doughlike, mass of masticated potato chip present on the teeth during chewing of potato chips of the prior art.

Still another object of the invention resides in the provision of a machine which is adapted to produce potato chips of more novel appearance than potato chips of the same general type have had heretofore.

Yet another object of the invention is to provide a potato chip piercing device which is adapted for the piercing of chips with many kinds of shapes of piercing including round piercings, diamond-shaped piercings, rectangular shaped piercings and others as desired.

A further object of the invention is in the provision of a machine which is adapted to be adjusted in such manner that the spacing of adjacent rows of piercings in a potato chip product can be adjusted beforehand in different ways for producing a great variety of designs on potato chips.

Another object of the invention is to provide a device for the purpose described which is sturdy and durable in construction, reliable and efficient in operation, and relatively simple and inexpensive to manufacture, assemble and utilize.

Another object of the invention is the provision of a potato chip having spaced apart, frangible hollow body portions each having a hole therein with visibility therethrough being substantially blocked for giving an outside appearance to the chips substantially the same as if there were no holes present.

Another object of the invention is the process of manufacturing potato chips of the character described from sliced raw chips.

Other and still further objects and advantages of the invention will become apparent from the following detailed description of a preferred embodiment thereof.

In the drawings:

Figure 3 is a right end elevation of the machine of Figure 1.

Figure 4 is an enlarged end elevation of a portion of the piercing-disc-carrying shaft of the invention including discs and adjacent parts, the positions of other discs and other spacing members being indicated in dotted lines.

Figure 5 is a right end view of the parts shown in Figure 4, with the exception of the shaft mounting member thereof, a portion of a piercing disc or wheel being shown having teeth in full lines, the outline of the teeth of the remainder of the wheel being shown in dotted lines only for convenience of illustration.

Figure 6 is a top plan view of a potato chip after being pierced by the machine of this invention.

Figure 1:
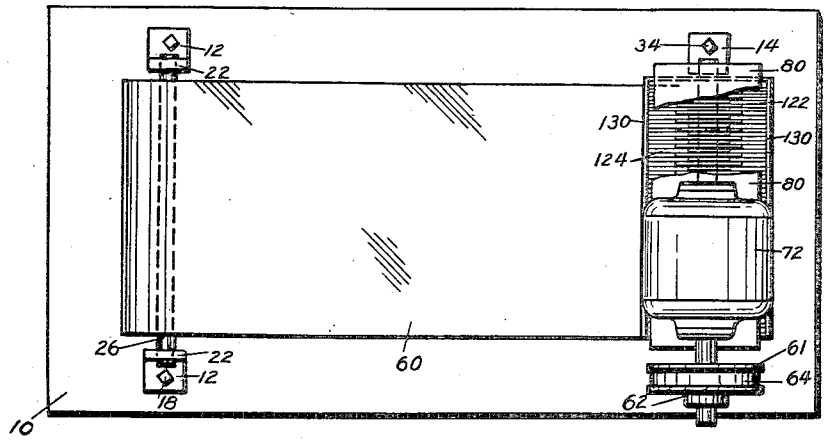
Figure 1 is a top plan view of the potato chip piercing machine of this invention, a portion of the motor mounting platform thereof being broken away.

Figure 7 is an enlarged side elevation of a modified potato chip piercing disc of the invention in which the teeth of the disc are provided with rectangular or diamond shaped heads. Only a portion of the disc is shown with diamond shaped heads in full lines, it being understood that the remainder of the disc is also provided with diamond shaped teeth. The outline of the diamond shaped teeth of the remainder of the disc is shown in dotted lines for convenience of illustration.

Figure 8 is a frontal elevation of the disc of Figure 7.

Figure 9 is an enlarged frontal elevation of another modified disc of the invention; the disc of Figure 9 being provided with teeth having circular outer ends. A portion of the disc is broken away for showing the side of one of the teeth more clearly.

Figure 10 is a fragmentary and enlarged plan view of a sliced raw potato chip showing a single hole made by the perforating dies of Figure 5, the view being drawn substantially five times scale.

Figure 11 is a cross-sectional view of a potato chip of Figure 10 taken along the line 11—11 thereof.

Figure 12 is a view similar to Figure 11 showing the hole after being cooked.

Figure 13 is a bottom view of the hole in the raw chip as viewed along the line 13—13 in Figure 11.

Figure 14 is a fragmentary and enlarged plan view of a sliced raw potato chip showing a single hole made by the perforating dies of Figure 9, the view being drawn substantially five times scale.

Figure 15 is a cross-sectional view of a potato chip of Figure 14 taken along the line 15—15 thereof.

Figure 16 is a view similar to Figure 15 showing the hole after being cooked.

Figure 17 is a bottom view of the hole in the raw chip as viewed along the line 17—17 in Figure 15.

The potato chip piercing machine of this invention is provided with a suitable base 10 having an upper surface normally horizontally disposed. On the base 10 four brackets are provided and are arranged in pairs 12 and 14 respectively.

The brackets 12 are disposed in spaced apart positions at one end of the platform 10 and are in the shape of a right angle, each straight portion of each of the brackets 12 having an aperture therethrough.

The apertures 16 through those portions of the brackets 12 which are disposed adjacent the base 10 are for the purpose of receiving bolts 18 for attaching the brackets 12 to the base 10. Those portions of the brackets 12 which are upstanding are provided with apertures 22 shown in dotted lines for receiving the opposite ends of a roller shaft 26. Upon the roller shaft 26 a cylindrical roller 30 is mounted.

The brackets 14 form with the base 10 and brackets 12 the frame of the machine and the brackets 14 are similarly constructed to the brackets 12 although the upstanding portions thereof are longer. The brackets 14 are secured to the base 10 by means of bolts 34 and the upstanding portion of each bracket 14 is provided with two vertically spaced transverse apertures 38 through which two shafts 40 and 42 are rotatably secured.

Figure 2:
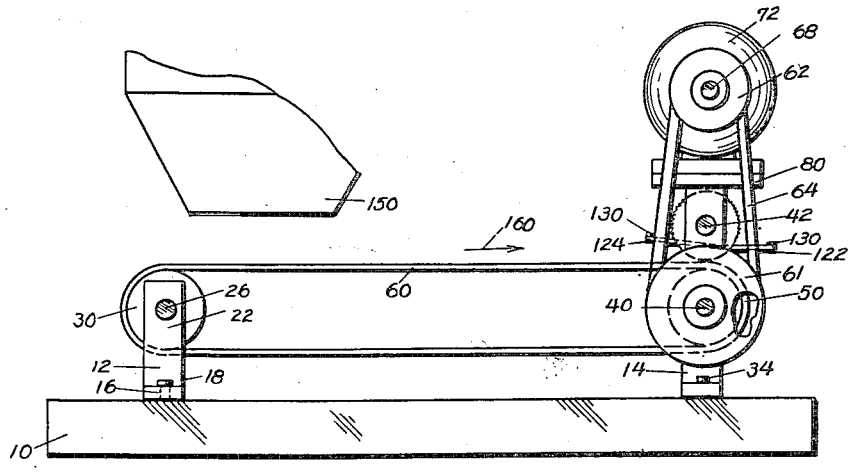
Figure 2 is a side elevation of the machine of Figure 1, a portion of a hopper for delivering potato chips to the machine of this invention being shown above the conveyor belt of the machine, a portion of the conveyor belt being shown in dotted lines.

The shafts 40 and 42 are disposed one above the other in horizontal alignment. On the shaft 40 a roller 50 is positioned as best seen in Figure 2.

The roller 50 is preferably formed of a resilient material such as rubber which is adapted to be compressed at times and yet return to its former shape. The roller 50 is of cylindrical shape and is preferably of the same size as the roller 30.

About the rollers 30 and 50 an endless belt 60 is provided. The belt 60 has a flat supporting surface preferably formed of resilient material such as rubber or the like also having the qualities of compressibility and ability to return to its original shape after a compressing force has been removed.

The lower shaft 40 preferably extends outwardly on one side of one of the brackets 14 for receiving a pulley 61 thereon which latter is drivably secured to a driving pulley 62 by means of a suitable belt 64. The driving pulley 62 is secured to the drive shaft 68 of an electrical motor 72. The motor 72 is itself mounted upon a platform 80 which latter is transversely disposed in horizontal position across the tops of the brackets 14.

The upper shaft 42 is provided with an elongated straight key-way ridge 90 on one side thereof and extending between the brackets 14. The key-way 90 is for the purpose of receiving thereon the walls of a key-way notch 92 which latter extends outwardly from the walls of a circular opening 94 in each of a plurality of piercing discs 96. The ridge 90 is preferably rectangular in cross-section and the notches 92 are preferably complementarily shaped rectangularly.

The discs 96 are provided on their outer edges with a plurality of piercing teeth 100. The teeth 100 are each shaped similarly to the teeth of a circular saw, as best seen in Figure 5, each tooth 100 is preferably of triangular shape in side elevation and the outer ends thereof slant in a direction opposite to the direction of rotation of the discs and rearwardly of the machine in the direction opposite to the direction of travel of the belt 60.

The teeth 100 of the several discs 96 form together the configuration of a cylinder so that all engage the belt 60 in their turn.

The discs 96 are maintained spaced apart from one another on the shaft 40 by means of spacing washers 102. The latter are of lesser diameter than the discs 96 and can all be alike and of uniform thickness if desired.

The discs 96 and the washers 102 are held on the shaft 42 by means of pins 110.

It will be also seen that the discs 96 can be arranged in groups if desired. In this fashion, one group of discs could be spaced apart a greater distance from adjacent groups than members of each group are spaced apart from each other. In the arrangement illustrated, however, the discs 96 are equidistantly spaced apart.

Between each of the discs 96 a push-off bar 120 is provided. The push-off bars 120 together form a plurality of parallel combing teeth, for preventing potato chips from sticking to the discs 96 in operation.

Each bar 120 is provided with a normally horizontal forward portion 122 and an upwardly inclined rearwardly extending portion 124. The purpose of the inclination of the portion 124 is for guiding potato chips therebeneath and to the discs 96.

Two transverse supporting bars 130 are provided and are secured to the combing bars 120 at the opposite ends thereof. The supporting bars 130 are disposed one on each side of the discs 96 and the ends of the bars 130 are suitably secured to the brackets 14 in a rigid manner.

In operation, it will be seen that potato chips falling downwardly on the belt 60 from the lower end of a hopper 150, best seen in Figure 1, will travel in the direction of the arrow 160 with the belt 60. The potato chips coming from the hopper 150 are preferably uncooked and of the "Saratoga" type having flat sides.

The chips will engage the undersides of the portions 124 of the combing bars 120 and will be guided between the piercing-discs or wheels 96 and the adjacent resilient belt 60.

The teeth 100 are normally disposed bearing down upon the resilient belt 60; consequently, when the potato chips pass between the teeth 100 and the belt 60, the chips are perforated with a plurality of minute perforations or piercings 151 as best seen on the potato chip 152 of Figure 6.

The piercings 151 are disposed in rows, each row being formed by a single one of the piercing-wheels 96. The piercings of a row are equidistantly spaced apart as are the points of the teeth 100. Each of the piercings 151 is elongated and is of the length the width of teeth 100. The piercings 151 are all disposed in parallelism.

It will be seen that the rows of piercings can be spaced apart in any desired manner for making different designs by placing more or fewer washers 102 between different ones of the piercing-discs 96.

Other modifications of the teeth can be used if desired. One such modification is shown in Figure 7 in which the teeth 160 of the wheel 96 thereshown, are provided with rectangular of diamond shaped outer ends as seen in edge view. The perforations formed by the diamond shaped teeth are consequently diamond shaped for providing a very novel potato chip.

Another modification of the teeth 100 is described in Figure 9 in which the teeth 170 of the wheel 96 thereshown are provided with flat circular outer surfaces as seen in edge view. In the modifications of Figures 7 and 9 the respective diamond and circular surfaces are disposed at right angle with respect to radii of the corresponding discs.

It will be seen that in addition to the rectangular or diamond shaped teeth 160 and the circular teeth 170 many other shapes of teeth can be employed.

This invention is particularly adaptable to potato chips which are commercially known as Saratoga Chips, but may be applied to other chips. In cooking the potato chips, there is a tendency for the chips to blister, destroying their value. The present invention prevents the chips from blistering, in that the blisters are punctured before they have an opportunity to form. In the present invention, the holes also enable the cooking medium or oil to permeate or filter therethrough in order to improve the cooking or taste of the chips. One important advantage of the present invention is that the holes are such that visibility therethrough is substantially blocked for giving an outside appearance to the chips substantially the same as if there were no holes present, so that the ordinary customer is unaware of the fact that the chips have been provided with holes. In other words, in the present invention, the holes are of the type that permit the cooking medium or oil to permeate or filter therethrough while at the same time substantially blocking visibility therethrough so that the ordinary customer is unaware of the fact that the chips have holes therethrough.

Ordinarily, potato chips are sliced to have a thickness of substantially .050 inch although this may vary plus-or-minus approximately .020 inch so that the ordinary potato chips may be approximately .020 to .070 inch thick. Preferably the lateral dimension of the dies or teeth 100, 160 and 170 may be approximately the same as the thickness of the chip. The area of each die is preferably less than .020 square inch and more preferably the area of the dies or teeth may be approximately .0030 to .0050 square inch. In the event the die is circular, the diameter may be approximately one-sixteenth of an inch, being about the same dimension as the thickness of the chip.

Figure 10 shows a plan view of a hole substantially five times scale and is indicated by the reference character 151. In operation, the plurality of spaced apart, sharp dies or teeth are pressed against the upper side of the raw chips and as the dies are further rotated, the dies move into the raw chips with pressure against the conveyor belt 60 to perforate the portions of the raw chips directly between the ends of the dies and the conveyor belt. As the dies are further rotated, they are separated from the raw chips and leave in the raw chips a hole in a plurality of perforated body portions with the body portions of the chips defining each hole having intact retracted walls 153 tending to close the hole for effectively reducing the visible cross-section of the hole to a value less than that of the dies or teeth which produced the hole. The perforations or piercings 151 in Figure 6 illustrate the fact that the holes tend to close after being perforated and thereby effectively reduce the visible cross-section of the hole to a value less than that of the dies or teeth which produces the holes. While the holes are not all the same, the enlarged cross-sectional view in Figure 11 is representative of a hole having intact retracted walls 153 tending to close the hole for effectively reducing the visible cross-section of the hole. The view in Figure 13, which is a bottom view of the hole in Figure 11, shows intact retracted walls 153. The Figure 10 shows the intact retracted walls 153 from the upper side of the chip. It is to be noted that the size of the hole for the upper side of the chip is slightly greater than the size of the hole for the bottom side of the chip. Figure 12 shows a view similar to Figure 11 after the chip has been cooked, and it is to be noted that the cooking medium, or oil, may filter through the hole and contact or cook the intact retracted walls and the perforated portion of the part of the chip surrounding each hole to form around each hole a cooked frangible body section 154 with the cooked intact retracted walls substantially blocking visibility through the holes for giving an outside appearance to the chips substantially the same as if there were no holes present. After the chips are cooked they are removed from the cooking medium and packaged for distribution. The cooked holes, as made by the present invention, are substantially indiscernible to the ordinary customer and about the only way one can see through the holes is to hold the chips up to the light and look therethrough.

The Figures 14, 15, 16 and 17 are comparable to Figures 10, 11, 12, and 13 respectively, except the enlarged holes 172 in the Figures 14, 15, 16 and 17 is made by one of the round teeth 170 of Figure 9. The retracted walls is indicated by the reference character 173 and the cooked frangible section by the reference character 174. The end of the teeth or dies 160 and 170 are blunt and have arched-end surfaces comprising segments of a cylinder. The blunt dies 160 and 170 compress and rupture the holes instead of piercing the holes.

It has been found in practice that the piercings cause the potato chip to cook more rapidly and cause the potato chip to cook more rapidly and uniformly, reducing fuel consumption; to have less starch content because of the ease with which soaking water can act on a larger surface area, because of the absence of blisters, because of the lesser amount of oil in cooking consumed due to the absence of oil-trapping blisters, a chip which is more crisp, stronger, and more edible and a chip which is of more novel and marketable appearance.

From the foregoing description it is thought to be obvious that a potato chip piercing machine constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

What is claimed is:

1. The process of manufacturing potato chips from sliced raw chips of potatoes having opposite faces, comprising the steps of making a plurality of piercings by transversely penetrating said chips from one side thereof towards the other side without substantial removal of material and with each piercing having a cross-sectional area less than .020 square inch in said sliced raw chips and at the same time stressing a peripheral portion of said sliced raw chips around each piercing, immediately relieving the stress in each said peripheral portion to inwardly contract the walls forming each piercing to substantially close said piercings and establishing piercings with each having a smaller cross-sectional area than that at the time said piercing was formed, cooking said pierced sliced raw chips in a cooking medium with the cooking medium directly contacting and cooking the body of said sliced raw chips and said contracted walls surrounding each piercing with said cooked retracted walls substantially blocking visibility through said piercings for giving an outside appearance to opposite sides of said cooked chips substantially the same as if there were no piercings present, and removing said cooked chips from said cooking medium.

References Cited in the file of this patent

UNITED STATES PATENTS

| | | |
|---|---|---|
| 678,514 | Regnier | July 16, 1901 |
| 1,676,160 | Ruffner | July 3, 1928 |
| 2,612,453 | Stahmer | Sept. 30, 1952 |